United States Patent Office 3,486,857
Patented Dec. 30, 1969

3,486,857
METHOD FOR THE QUALITATIVE IDENTIFICATION OF POLYURETHANE ELASTOMERS
Panagiotis L. Panagoulias, Highland Park, Mich., assignor to the United States of America as represented by the Secretary of the Army
No Drawing. Filed Mar. 2, 1967, Ser. No. 621,108
Int. Cl. G01n 31/22, 31/00
U.S. Cl. 23—230                          10 Claims

ABSTRACT OF THE DISCLOSURE

A method for the qualitative identification of polyurethane rubber under all conditions of occurrence comprising the steps of dissolving a test sample in methylcellosolve; adding water to the test sample solution; depolymerizing and hydrolyzing the polymer test sample through the addition of potassium hydroxide; neutralizing and acidifying said hydrolyzed and depolymerized test sample with an acid; and reacting said depolymerized and hydrolyzed test sample with P-dimethylaminobenzaldehyde; said method yielding a chromophoric quinonoid when said test sample contains a polyurethane elastomer.

---

The invention described herein may be manufactured and used by or for the Government for governmental purposes without the payment to me of any royalty thereon or therefor.

The present invention relates to a method for the qualitative idenification of polyurethane elastomeers under all conditions of occurrence. ore particularly, the invention relates to a catalytic, non-pyrolytic, purely chemical method for the qualitative identification of polyurethane elastomers under all conditions of occurence.

The prior art methods of identifiying the polyurethane elastomers as well as other elastomers were almost universally initiated by a pyrolysis of the elastomer sample to be tested. Subsequently, the vapors produced by the pyrolysis were passed through one or two reagent solutions which produced specific colors according to the elastomer compound present in the sample. Such methods were suitable and accurate so long as the composition of the test sample consisted of a single elastomer compound or, in the exceptional case, of natural rubber and polyisoprene elastomer compounds. If other elastomers were present in the test sample as compounds of or mixtures with polyurethanes or another elastomer being tested for, the solution would produce a colored characteristic for each of the elastomers present and thus yield an unreadable result. The most that could be said in such cases was that the sample contained a mixture of elastomers, and it was all but impossible to determine what these elastomers were with prior art methods.

It is therefore the object of the present invention to provide a method for the qualitative identification of polyurethane elastomers which obviates the above difficulty.

Another object of the present invention is the provision of a method for the qualitative identification of polyurethane elastomers under all conditions of occurrence including as compounds or mixtures with other elastomer compounds.

Sill another object of the present invention is the provision of a method for the qualitative identification of polyurethane elastomers under all conditions of occurrence, which method eliminates the pyrolytic step of prior art methods.

The following description will make other objects and advantages of the present invention obvious to those skilled in the qualitative analytical arts.

According to the present invention, there is provided a method for the qualitative identification of polyurethane elastomers under all conditions of occurrence, which method by the addition of certain chemical compounds, and the utilization of specific procedures eliminates the interference of other polymers or mixtures of polymers which may be present in a given test sample, while producing a specific colored solution indicative of the presence of polyurethane elastomers.

More particularly, the invention provides a method for the qualitative identification of polyurethane elastomers under all conditions of occurrence comprising the steps of: dissolving a test sample in methylcellosolve; adding water to the test sample solution; depolymerizing and hydrolyzing the test sample through the addition of KOH; neutralizing and acidifying with an acid; and reacting said depolymerized and hydrolyzed sample with P-dimethylaminobenzaldehyde; said method yielding a specifically colored solution when said test sample contains a polyurethane elastomer.

A portion, about three grams, of a sample which is to be tested is cut into small pieces and extracted with acetone according to ASTM Procedure D-297 for an eight to ten hour period. The purpose of this extraction is the removal of all traces of vulcanization and as such, the step is primarily precautionary. It thus may be performed or eliminated according to the nature of the sample being tested.

The extracted sample is then air dried and transferred to a container containing 80 ml. of methylcellosolve. This mixture is refluxed for a period of about 2 hours in order to insure proper solution of the test sample in the methylcellosolve. The solution is then transferred to another test tube containing 10 ml. of distilled water.

At this point the test sample is depolymerized and hydrolyzed through the addition of KOH to the test sample solution. The solution is rendered alkaline and subsequently refluxed for a period of about 2 hours at a temperature of about 120° C. in order to insure proper and complete depolymerization and hydrolysis. The tube and contents are then removed from the heating means, allowed to cool, and the solution neutralized and then acidified with concentrated HCl, hydrochloric acid, in excess. Five (5) ml. of the acidified solution is then transferred to a test tube containing 0.05 g. of P-dimethylaminobenzaldehyde. This mixture is boiled for a few seconds.

The formation of a yellow precipitate with dyeing properties on fibers indicates the presence of a polyurethane elastomer. The alkaline hydrolysis with KOH readily forms the corresponding primary aromatic amine of the polymer present in the test sample as well as $CO_2$. The aforementioned product formation is shown as follows:

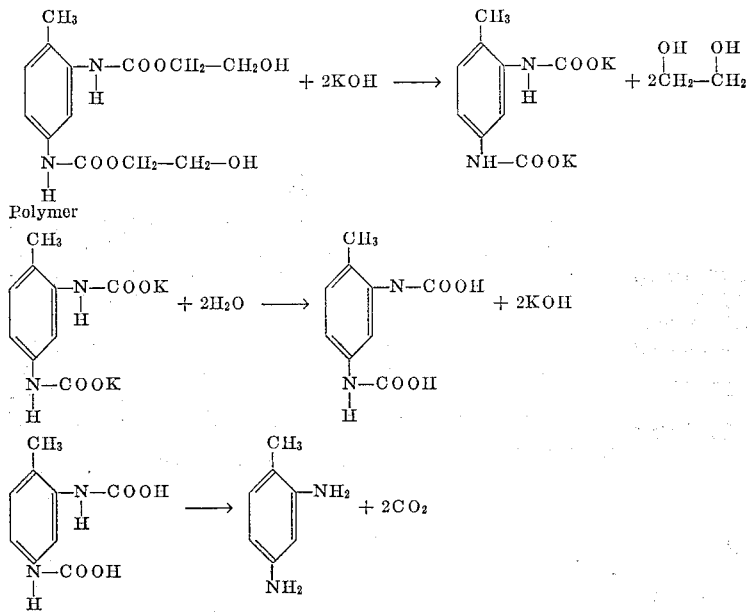

The P-dimethylaminobenzaldehyde first reacts with the hydrogen atom of the amine group and forms water with the oxygen of the carbonyl group, and 1-P-dimethylaminobenzaldiden with an azomethine (—CH=N—) chromophore group. In alkaline or neutral solution this latter compound is colorless. With the addition of HCl, the yellow precipitate possessing permanent dyeing properties on fibers is formed. This latter color producing reaction, which occurs with the addition of HCl, is explained by the rearrangement of the benzaldehyde ring to form an aquinonoid chromofore under the addition of the hydrogen of the HCl to the nitrogen of the azomethine group and the chloride (Cl) ion on the nitrogen of the dimethylamino group. The quinonoid group is fundamentally responsible for the color, however, such color is augmented by the pressure of the dimethylaminoauxochrome group. The reactions which give rise to the colored precipitate are represented graphically as follows:

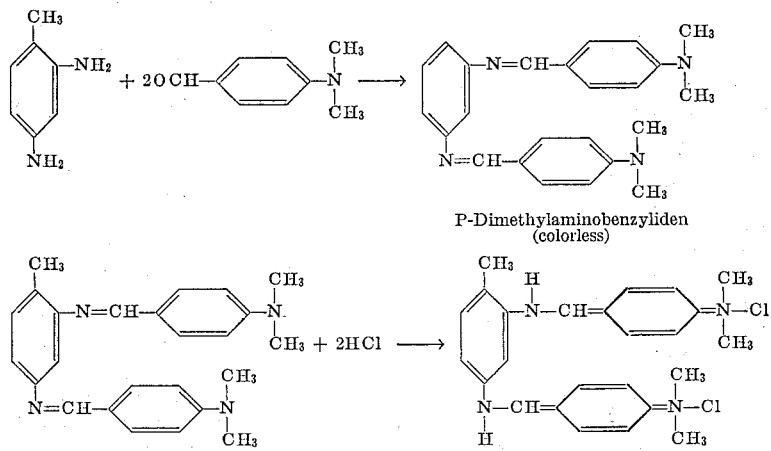

Thus, the method, through the depolymerization and hydrolysis of the test sample and subsequent reaction with P-dimethylaminobenzaldehyde yields a specific colored solution indicative of the presence of the polyurethane elastomer. Through the exercise of proper procedures, the interference of other elastomers which may be present in the sample is eliminated.

What is claimed is:
1. A method for the qualitative identification of polyurethane elastomers comprising the steps of:
 (a) dissolving a test sample a methylcellosolve to form a test sample solution;
 (b) adding water to said test sample solution;
 (c) treating said test sample solution with potassium hydroxide;
 (d) neutralizing said potassium hydroxide treated test sample solution with hydrochloric acid; and
 (e) reacting said acidified test sample solution with P-dimethylaminobenzaldehyde to form a chromophoric quinonoid when said test sample solution contains a polyurethane elastomer.

2. A method in accordance with claim 1 wherein said chromophoric quinonoid is a yellow colored precipitate when said test sample contains a polyurethane elastomer.

3. A method in accordance with claim 1 wherein said test sample solution is refluxed for about two hours subsequent to treatment with said potassium hydroxide and prior to acidification with said hydrochloric acid.

4. A method in accordance with claim 1 wherein said test sample solution is boiled briefly subsequent to reaction with said P-dimethylaminobenzaldehyde.

5. A method in accordance with claim 1 wherein said test sample solution is refluxed immediately subsequent to formation and prior to said water addition.

6. A method in accordance with claim 5 wherein said test sample solution is refluxed for about two hours subsequent to treatment with said potassium hydroxide and prior to acidification with said hydrochloric acid.

7. A method in accordance with claim 1 wherein said test sample is extracted with acetone according to ASTM Procedure D-297 prior to being dissolved in said methyl-cellosolve.

8. A method in accordance with claim 7 wherein said test sample solution is refluxed for about two hours subsequent to treatment with said potassium hydroxide and prior to acidification with said hydrochloric acid.

9. A method in accordance with claim 7 wherein said test sample solution is refluxed immediately subsequent to formation and prior to said water addition.

10. A method in accordance with claim 7 wherein said test sample solution is boiled briefly subsequent to reaction with said P-dimethylaminobenzaldehyde.

References Cited

Burchfield, H., Chem. Abstr. 40, $3292^2$, 1946.
Mano, E. B., Chem. Abstr. 57, 997f ,1962.
ASTM Standards on Rubber Products 1957, pp. 132, 133, TS1892A45.

MORRIS O. WOLK, Primary Examiner

R. M. REESE, Assistant Examiner